United States Patent
Sonoda et al.

(10) Patent No.: US 11,325,186 B2
(45) Date of Patent: May 10, 2022

(54) METHOD FOR MANUFACTURING SINTERED COMPONENT, SINTERED COMPONENT, AND DRILL

(71) Applicants: SUMITOMO ELECTRIC SINTERED ALLOY, LTD., Takahashi (JP); NIKKEN TOOL CO., LTD., Kadoma (JP)

(72) Inventors: Yasunori Sonoda, Takahashi (JP); Ryota Take, Takahashi (JP); Fumihiro Matsumoto, Inazawa (JP); Tsuguru Sugimoto, Kadoma (JP)

(73) Assignees: Sumitomo Electric Sintered Alloy, Ltd., Takahashi (JP); Nikken Tool Co., Ltd., Kadoma (JP)

( * ) Notice: Subject to any disclaimer, the term of this patent is extended or adjusted under 35 U.S.C. 154(b) by 1016 days.

(21) Appl. No.: 15/535,263

(22) PCT Filed: Dec. 8, 2015

(86) PCT No.: PCT/JP2015/084429
§ 371 (c)(1),
(2) Date: Jun. 12, 2017

(87) PCT Pub. No.: WO2016/093244
PCT Pub. Date: Jun. 16, 2016

(65) Prior Publication Data
US 2017/0320136 A1   Nov. 9, 2017

(30) Foreign Application Priority Data

Dec. 12, 2014   (JP) .............................. JP2014-252531

(51) Int. Cl.
*B22F 3/16* (2006.01)
*B23B 51/02* (2006.01)
(Continued)

(52) U.S. Cl.
CPC ................ *B22F 3/162* (2013.01); *B22F 5/10* (2013.01); *B23B 51/02* (2013.01); *C22C 38/00* (2013.01);
(Continued)

(58) Field of Classification Search
CPC . B23B 51/02; B23B 2251/18; B23B 2251/04; B23B 2251/125; B23B 2251/082; B22F 3/162
See application file for complete search history.

(56) References Cited

U.S. PATENT DOCUMENTS 4,839,949 A * 6/1989 Sobue ................... C04B 35/597
  492/53
4,882,304 A * 11/1989 Novich ................. B01F 3/1214
  501/32
(Continued)

FOREIGN PATENT DOCUMENTS

CN      102825255 A    12/2012
CN      102917823 A     2/2013
(Continued)

OTHER PUBLICATIONS

Machine Translation of JP-2006165300-A (Year: 2006).*
(Continued)

*Primary Examiner* — Paul A Wartalowicz
*Assistant Examiner* — Ryan L Heckman
(74) *Attorney, Agent, or Firm* — Baker Botts L.L.P.; Michael A. Sartori

(57) ABSTRACT

Provided is a method for manufacturing a sintered component, which can suppress occurrence of edge chipping when a through-hole is formed in a powder-compact green body and also has a good productivity. The method for manufacturing a sintered component includes a molding step of press-molding a raw material powder containing a metal
(Continued)

powder and thus fabricating a powder-compact green body; a drilling step of forming a hole in the powder-compact green body using a drill; a sintering step of sintering the powder-compact green body after drilling, wherein the drill used for drilling has a circular-arc shaped cutting edge on a point portion thereof.

4 Claims, 5 Drawing Sheets

(51) Int. Cl.
 *C22C 38/00* (2006.01)
 *B22F 5/10* (2006.01)
 *B22F 5/06* (2006.01)
(52) U.S. Cl.
 CPC ............ *B22F 5/06* (2013.01); *B22F 2998/10* (2013.01); *B23B 2251/082* (2013.01); *B23B 2251/18* (2013.01); *B23B 2251/408* (2013.01)

(56) References Cited

U.S. PATENT DOCUMENTS

| | | | |
|---|---|---|---|
| 5,403,373 | A | 4/1995 | Kitagawa et al. |
| 5,725,338 | A | 3/1998 | Cabaret et al. |
| 5,900,559 | A | 5/1999 | Nakamura et al. |
| 2003/0202853 | A1* | 10/2003 | Ko .................. B23B 51/02 408/225 |
| 2007/0274163 | A1 | 11/2007 | Wild |
| 2009/0191368 | A1* | 7/2009 | Hironaga ............ B24D 7/10 428/34.4 |
| 2010/0166514 | A1 | 7/2010 | Okumura |
| 2011/0064937 | A1* | 3/2011 | Mukoyama ............ C22C 1/05 428/312.6 |
| 2011/0268518 | A1* | 11/2011 | Sampath ............ B23P 15/32 408/59 |
| 2014/0169898 | A1* | 6/2014 | Goh ................ B24B 3/26 408/1 R |
| 2015/0357118 | A1* | 12/2015 | Lee ................... B22F 3/24 148/104 |
| 2017/0320136 | A1 | 11/2017 | Sonoda et al. |

FOREIGN PATENT DOCUMENTS

| | | | |
|---|---|---|---|
| JP | S49-090969 | A | 8/1974 |
| JP | S58-189305 | A | 11/1983 |
| JP | S61-003803 | A | 1/1986 |
| JP | S61-264102 | A | 11/1986 |
| JP | S62-096601 | A | 5/1987 |
| JP | S62-208527 | A | 9/1987 |
| JP | H05-171205 | A | 7/1993 |
| JP | H05-171334 | A | 7/1993 |
| JP | H06-145703 | A | 5/1994 |
| JP | H07-195216 | A | 8/1995 |
| JP | 10-073132 | A | 3/1998 |
| JP | 2002-249887 | A | 9/2002 |
| JP | 2003-205410 | A | 7/2003 |
| JP | 2004-346358 | A | 12/2004 |
| JP | 2006-165300 | A | 6/2006 |
| JP | 2006165300 | A | * 6/2006 |
| JP | 2006-336078 | A | 12/2006 |
| JP | 2007-510895 | A | 4/2007 |
| JP | 2009-172518 | A | 8/2009 |
| JP | 2009-185328 | A | 8/2009 |
| JP | 2011-069372 | A | 4/2011 |
| JP | 2011-144419 | A | 7/2011 |
| JP | 2012-241728 | A | 12/2012 |
| JP | 2012-254501 | A | 12/2012 |
| JP | 2012254501 | A | * 12/2012 |
| JP | 2016-113657 | A | 6/2016 |
| KR | 2001-0052113 | A | 6/2001 |
| WO | 99/28067 | A1 | 6/1999 |
| WO | 02/50331 | A2 | 6/2002 |
| WO | 2007-114146 | A1 | 10/2007 |
| WO | 2011135277 | A1 | 11/2011 |

OTHER PUBLICATIONS

Machine Translation of JP-2012254501-A (Year: 2012).*
Decision of Refusal issued in counterpart Japanese Patent Application No. 2018-224221 dated Dec. 21, 2020.
German et al., "Science of powder metallurgy," first Edition, Tokyo High Court, 1996, ISBN 4-7536 to 5091-X, pp. 244 to 247, and 300 to 303 [Cited in NPL 1].
Eijiro, "Expansion and contraction accompanied by sintering of metallic green compact," Journal of the Japan Society of Metallurgy, 1987, vol. 26, No. 9, pp. 842-866 [Cited in NPL 1].

* cited by examiner

METHOD FOR MANUFACTURING SINTERED COMPONENT, SINTERED COMPONENT, AND DRILL

TECHNICAL FIELD

The present invention relates to a method for manufacturing a sintered component, a sintered component and a drill for drilling a powder-compact green. In particular, the present invention relates to a method for manufacturing a sintered component, which can suppress occurrence of edge chipping when a through-hole is formed in a powder-compact green body and also has a good productivity.

BACKGROUND ART

Sintered bodies (sintered alloys) obtained by sintering green bodies made of a metal powder, such as an iron powder, are used for automobile parts or machine parts. For example, such sintered alloy components (hereinafter, simply referred to as a "sintered component") include sprockets, rotors, gears, rings, flanges, pulleys, vanes, bearings and the like. In general, the sintered components are manufactured by press-molding a raw material powder containing a metal powder to fabricate a powder-compact green body (powder compact body) and then sintering the powder-compact green body. After sintering, if necessary, the sintered components are subjected to machining as a finish processing.

However, as sintered components, components are known, in which a through-hole (open-hole), which extends therethrough, or a blind hole, which does not extend therethrough, is formed. For example, a component is known, in which a through-hole (e.g., an oil hole) is formed to extend from an outer circumferential surface thereof to an end surface or an inner circumferential surface. In such a component, a through-hole cannot be integrally formed in a powder-compact green body during molding, and thus after sintering, drilling is performed using a drill (see Patent Document 1).

As drills used for drilling, a drill, in which a cutting edge on a point portion thereof has a V-shaped projection shape, is typical. In the case of sintered carbide drills, a point angle of the entire cutting edge is in the order of 130° to 140°.

CITATION LIST

Patent Document

Patent Document 1: Japanese Patent Application publication No. 2006-336078

SUMMARY OF INVENTION

Technical Problem

In the case where drilling using a drill is performed on a sintered component, there is a problem in that drilling after sintering is difficult and has a low productivity.

The sintered component is hard, since metal powder particles therein are diffusion-bonded and alloyed with each other by sintering, thereby forming a strong bonding therebetween. Accordingly, when drilling using a drill is performed on the sintered component, a cutting resistance is high and thus the drill is difficult to penetrate into the sintered component. Therefore, cutting is difficult, a long time is required for machining and also to tool life is decreased. Also, since a resistance upon hitting of the drill is also high, it is difficult to obtain a stable precision of the machined hole, due to the fact that a rotation axis of the drill is likely to be shaken and the like.

In addition, since a cutting resistance is high and also a thrust load is high, when a through-hole is formed, burrs are likely to occur along an opening edge on the exit side, through which the drill comes out. The burrs occur since if a thickness of a bottom of a hole when a drill penetrates becomes so thin that a strength of the bottom against a thrust load cannot be maintained, the bottom is deformed and pushed out to the exit side. The occurred burrs have to be removed in the subsequent step and thus time and efforts are required for such an operation. It is difficult or impossible to remove the burrs depending on locations where the burrs occur.

Therefore, in view of reduction of manufacturing costs, it is desirable to improve productivity in manufacturing a sintered component.

Accordingly, the present inventors have considered performing drilling on a powder-compact green body before sintering by a drill so that a through-hole is formed in the powder-compact green body in advance, instead of performing drilling on a sintered component after sintering by a drill. The powder-compact green body is obtained by only agglomerating a raw material powder by molding, and thus metal powder particles therein are mechanically adhered with each other, not strongly bonded to each other as in the sintered body. Therefore, when drilling is performed on the powder-compact green body before sintering, cutting can be easily performed and also a cutting resistance (thrust loaf) can be significantly reduced, since bonding between metal powder particles thereof is weak. When drilling is performed on the powder-compact green body, a through-hole is formed as metal powder particles are cut while being scrapped by the drill. However, is drilling is performed on the powder-compact green body, when a through-hole is formed, so-called edge chipping that an opening edge on the exit side, through which the drill comes out, is chipped is likely to occur.

Accordingly, one of objects of the present invention is to provide a method for manufacturing a sintered component, which can suppress occurrence of edge chipping when a through-hole is formed in a powder-compact green body and also has a good productivity. Another object of the present invention is to provide a sintered component, which has a good productivity. Further another object of the present invention is to provide a drill, which can suppress occurrence of edge chipping when a through-hole is formed in a powder-compact green body.

Solution to Problem

A method for manufacturing a sintered component according to one aspect of the present invention includes a molding step, a drilling step and a sintering step. The molding step is configured to press-mold a raw material powder containing a metal powder and thus to fabricate a powder-compact green body. The drilling step is configured to form a hole in the powder-compact green body using a drill. The sintering step is configured to sinter the powder-compact green body after drilling. The drill used for drilling has a circular-arc shaped cutting edge on a point portion thereof.

A sintered component according to one aspect of the present invention is a sintered component having a hole formed therein. In the sintered component, an inner circumferential surface of the hole has a satin finish shape.

A drill according to one aspect of the present invention is a drill for drilling a work material. The work materials is a powder-compact green body fabricated by press-molding a raw material powder containing a metal powder. The drill has a circular arc-shaped cutting edge on a point portion thereof.

Advantageous Effects of Invention

The method of manufacturing a sintered component as described above can suppress occurrence of edge chipping when a through-hole is formed in a powder-compact green body and also has a good productivity. The sintered component as described above has a good productivity. The drill as described above can suppress occurrence of edge chipping when a through-hole is formed in a powder-compact green body.

DESCRIPTION OF EMBODIMENTS

Explanation of Exemplary Embodiments of the Invention

The present inventors have studied technologies for improving productivity of a sintered component and as a result have found that the productivity can be enhanced if drilling using a drill is performed on a powder-compact green body before sintering, not after sintering. The reason is that when drilling is performed on the powder-compact green body, cutting is easily performed and cutting resistance (thrust load) is significantly reduced, since bonding between metal powder particles is weak. Further, as compared with a conventional case where drilling is performed after sintering, a machining time can be reduced, a precision of a machined hole can be enhanced and also a too life can be significantly improved. Further, when drilling using a drill is performed on the powder-compact green body, burrs hardly occur. Even if burrs have occurred, the burrs can be easily removed by an air blower or the like, and thus time and efforts required for a bur removing operation can be reduced.

Also, the present inventors have further progressed the above studies and as a result have found that occurrence of edge chipping when a through-hole is formed can be suppressed by devising a shape of a drill used for drilling of the powder-compact green body, in particular a shape of a cutting edge on a point portion thereof. Specifically, it has been found that occurrence of edge chipping can be suppressed by forming a shape of the cutting edge into a circular-arc shape (R-shape).

A mechanism of occurrence of edge chipping is thought as follows. The powder-compact green body is soft since bonding between metal powder particles is weak. Therefore, if a thickness of a bottom of a hole formed by a drill when the drill penetrates becomes so thin that a strength of the bottom against a thrust load cannot be maintained, the bottom is not cut by the drill but comes off (pushed out) to an exit side before the drill passes through the bottom. When the bottom is not cut but comes off, the vicinity of the bottom also collapses, and as a result, chipping occurs on an edge of an opening on the exit side, through which the drill comes out.

Figure 1:
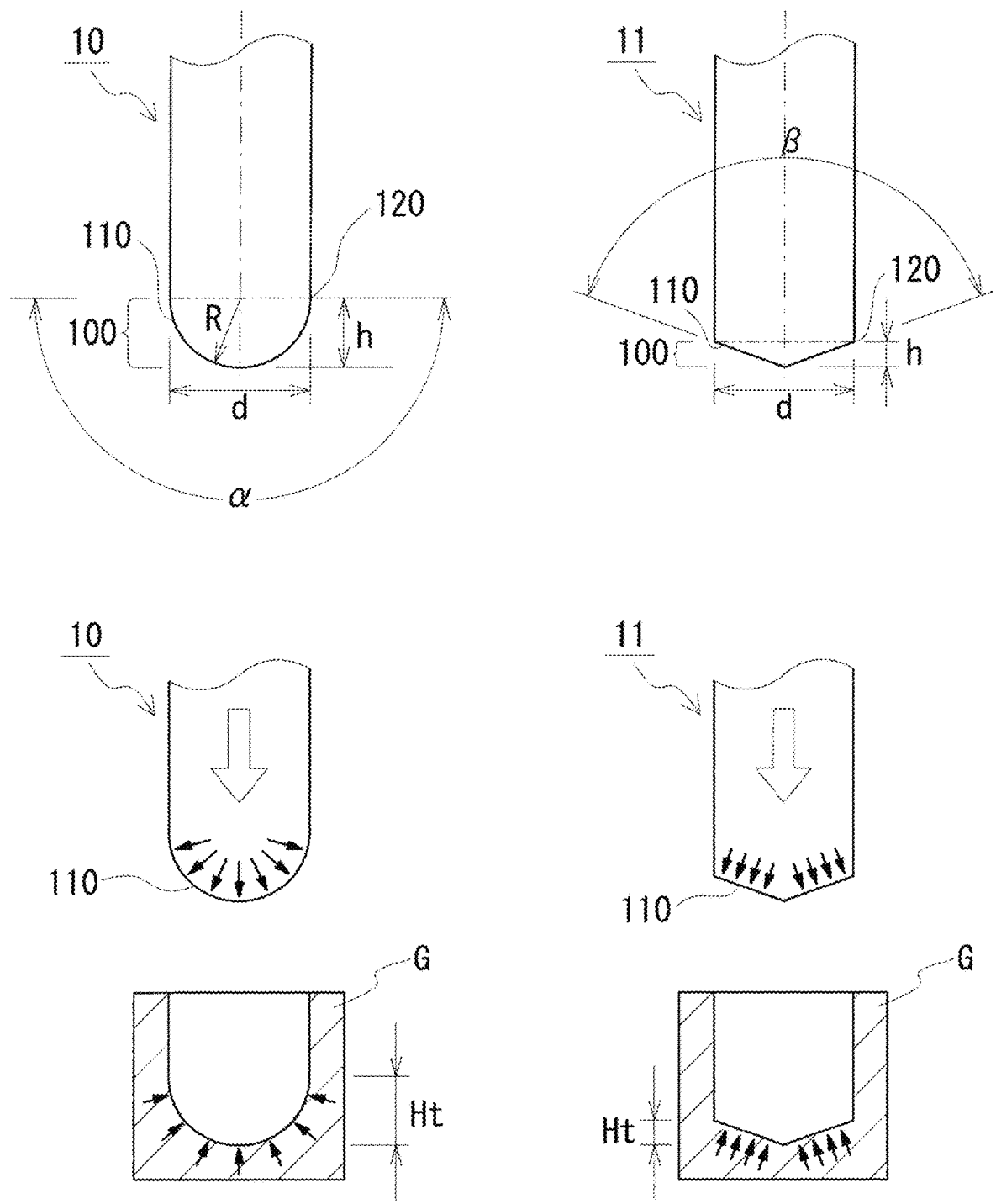
FIG. 1 is an explanatory view comparing between a case where drilling is performed using a drill having a circular arc-shaped cutting edge and a case where drilling is performed using a drill having a V-shaped cutting edge.

The reason that occurrence of edge chipping can be suppressed by using a drill having a circular arc-shaped cutting (hereinafter, often referred to as a "R drill") is thought as follows. Views on the left side of FIG. 1 show a drill (R drill) 10, in which a shape of a cutting edge thereof is a circular arc shape, and a work material (powder-compact green body) G, on which drilling has been performed using the R drill 10. In order to make the explanation easier to understand, the R drill 10 illustrated in FIG. 1 is simply shown by omitting grooves and the like. As shown in a view on the left upper side of FIG. 1, the R drill 10 is configured so that a shape of a cutting edge 110 is a semi-circular shape, a central angle $\alpha$ of a circular arc defining the cutting edge 110 is 180°, and also a radius R of the circular ac is equal to a radius d/2 of the drill. The R drill 10 is configured so that a length h of a point portion 100 along an axial direction of the drill is equal to the radius R of the circular arc. The point portion 100 is a portion ranging from a point (apex) of the cutting edge 110 to outer corners 120.

As shown in two views on the left lower side of FIG. 1, when drilling is performed on a powder-compact green body G using the R drill 10 (an outlined arrow in the figure indicates a feed direction of the drill), the shape of the cutting edge 110 is transferred to the powder-compact green body G, so that a hole, of which a bottom surface has a cross section of a circular arc (semi-circular) shape, i.e., a hemispheric hole is formed in the powder-compact green body G. Since the shape of the cutting edge 110 is the circular arc (semi-circular arc) shape, as indicated by solid arrows in the figure, a thrust load is exerted in a radially dispersed state on the R drill 10. Also, in the powder-compact green body G, as indicated by solid arrows in the figure, the bottom of the hole having the hemispheric shape bears a thrust load from the drill by a spherical surface thereof, and thus has a higher resistance to deformation and a higher strength.

In other words, when drilling is performed on the powder-compact green body G using the R drill 10, the thrust load itself is lower and also the trust load exerted on the bottom is dispersed. Accordingly, a stress concentration is reduced and the bottom is hardly chipped.

Also, as shown in the view on the left lower side of FIG. 1, a maxima thickness Ht of the bottom of the hole is defined as a length from a surface of the thinnest portion (deepest portion) of the bottom to a surface of the thickest portion of the bottom. The maximum thickness Ht of the bottom of the hole is equal to a length h of the point portion 100 and is increased as the length h of the point portion 100 is increased. The R drill 10 can have an increased maximum thickness Ht and thus a strength of the bottom is enhanced corresponding to the thickness. Due to these together with the lower thrust load, when drilling is performed on the powder-compact green body G using the R drill 10, even if a thickens of a bottom of a through-hole when the drill penetrates becomes then, it is possible to facilitate the bottom to remain in place against the thrust load and thus to allow the drill to perform cutting until just before the drill penetrates therethrough. Therefore, it is possible to suppress the bottom from collapsing without being cut before the drill penetrates therethrough and thus to suppress occurrence of edge chipping.

These have an effect even on a blind hole just before penetration, other than a through-hole. Specifically, even in the case of a blind hole in which a thickness of a bottom of the hole (minimum thickness as measured from a bottom surface of the hole to the opposite surface) is thin, it is possible to suppress the bottom from collapsing and thus to form a blind hole, of which a bottom has a thinner thickness. For example, machining can be performed until a thickness of the bottom becomes ½ of a drill diameter (hole diameter), further ¼ of the drill diameter.

On the other hand, when a drill having a V-shaped cutting edge (hereinafter, often referred to as a "V drill"), which is conventionally widely used, is employed, it is difficult to suppress occurrence of edge chipping. Views on the right side FIG. 1 show a drill (V drill) 11, in which a shape of a cutting edge thereof is a V shape, and a work material (powder-compact green body) G, on which drilling has been performed using the V drill 11. Like the R drill 10, the V drill 11 illustrated in FIG. 1 is simply shown by omitting grooves and the like. Also, in this example, the V drill 11 is configured so that a point angle β of a cutting edge 110 thereof is in the order of 130° to 140° and a drill diameter d is equal to that of the R drill 10.

As shown in two views in the right lower side of FIG. 1, when drilling is performed on a powder-compact green body G using the V drill 11, the shape of the cutting edge 110 is transferred to the powder-compact green body G, so that hole, of which a bottom has a cross section of a triangle shape, i.e., a conical shape, is formed in the powder-compact green body G. In the V drill 11, since the shape of the cutting edge 110 is the V shape (triangle shape), as indicated by solid arrows in the figure, a thrust load is exerted in a direction perpendicular to sides of the triangle (conical surface). Meanwhile, in the powder-compact green body G, as shown in solid arrows in the figure, the conical bottom surface of the hole bears a thrust load from the drill by sides of the triangle (conical surface), and thus stress is concentrated at apex at which sides intersect with each other. Namely, the conical bottom surface of the hole causes a stress concentration and has a lower strength, as compared with a hemispheric bottom surface of the hole.

In other words, when drilling is performed on the powder-compact green body G using the V drill 11, the V drill 11 cannot disperse the thrush load exerted on the bottom cannot be dispersed, as compared with the R drill 10, and thus the bottom is likely to be chipped.

Also in the case of the V drill 11, a maximum thickness of the bottom surface of the hole is smaller and thus a strength of the bottom is decreased corresponding to the thickness. Therefore, when drilling is performed on the powder-compact green body G using the V drill 11, if the thickness of the bottom when the drill penetrates becomes thin, the bottom is likely to collapse without being cut before the drill penetrates therethrough. Accordingly, it is difficult to suppress occurrence of edge chipping.

Meanwhile, the V drill is generally used upon drilling. The reason is that a sharp point of the V drill can be thrust at the center of a hole to be machined into a workpiece and this the drill can be precisely positioned at the center of the hole. Although attempting to use the R drill for drilling, the R drill cannot be thrust into a workpiece and thus cannot be precisely positioned. For this reason, the V drill is generally used upon drilling.

However, according to the present invention, drilling is performed on a powder-compact green body having a lower strength. Since the strength of the powder-compact green body is lower, the present inventors have found that even in the case of the R drill, a point thereof an be also thrust into the powder-compact green body and thus be precisely positioned. For this reason, the present inventors have found that drilling can be performed by the R dill and then that if drilling is performed using the R drill, it is possible to prevent burrs from occurring as described above and the like.

The present inventors have obtained the above findings and completed the present invention. First, exemplary embodiments of the present invention will be listed and described.

(1) A method for manufacturing a sintered component according to one aspect of the present invention includes a molding step, a drilling step and a sintering step. The molding step is configured to press-mold a raw material powder containing a metal powder and this to fabricate a powder-compact green body. The drilling step is configured to form a hole in the powder-compact green body using a drill. The sintering step is configured to sinter the powder-compact green body after drilling. The drill used for drilling has a circular-arc shaped cutting edge on a point portion thereof.

According to the method for manufacturing a sintered component as described above, drilling using a drill is performed on a powder-compact green body before sintering. Accordingly, cutting can be easily performed and also a cutting resistance (thrust load) can be significantly reduced. Therefore, as compared with a conventional manufacturing method in which drilling using a drill is performed after sintering, a machining time can be reduced, a precision of a machined hole can be enhanced and also a tool life can be significantly improved. Further, when drilling using a drill is performed on the powder-compact green body, burrs hardly occur. Even if burrs have occurred, the burrs can be easily removed, for example, by an air blower, and thus time and efforts required for a bur removing operation can be reduced. The "hole" includes a through-hole (open hole), which extends throughout, or a blind hole, which does not extend throughout.

Further, in the method for manufacturing a sintered component as described above, drilling portion thereof. Accordingly, when a through-hole is formed in the powder-compact green body, occurrence of edge chipping can be suppressed. As a result, the method for manufacturing a sintered component as described above can suppress occurrence of edge chipping and also has a good productivity.

Figure 3:
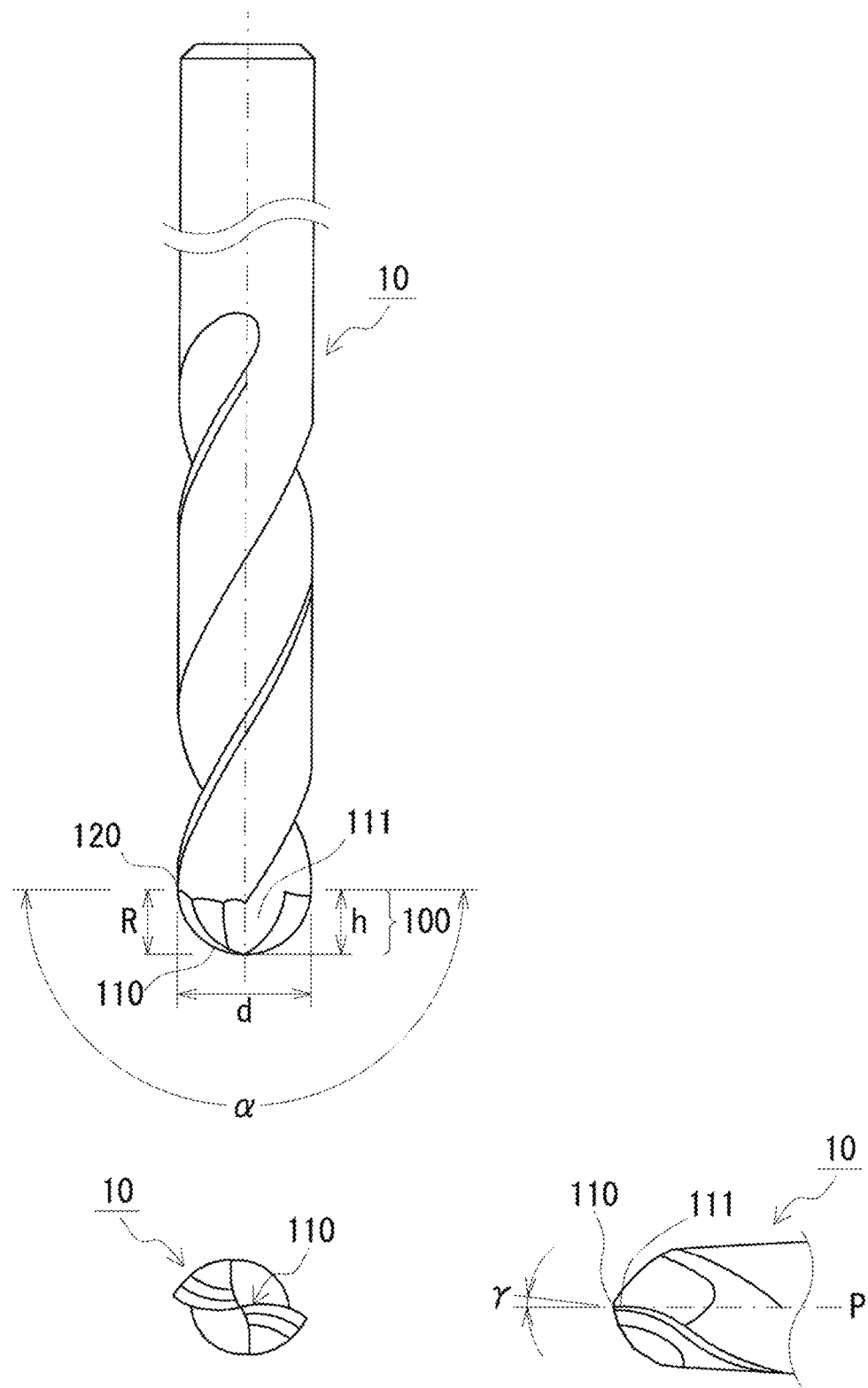
FIG. 3 is a schematic view explaining an example of drill according to an embodiment.

Meanwhile, as used herein, the term "shape of the cutting edge" refers to a projection shape of the cutting edge as projected to a plane, which passes through a center axis of the drill and also is parallel to the center axis, in a direction perpendicular thereto in a state where the cutting edge are arranged to be parallel to the parallel plane Also, the term "circular arc-shaped cutting edge" means that a projection shape of a cutting edge is a circular arc shape (see a view on the left upper side of FIG. 3). In the case where a shape of the cutting edge is a circular arc shape, when viewing the drill, which is being rotated, from a direction perpendicular to a rotation axis of the drill, a rotational trajectory of the cutting edge is looked like a circular arc shape.

(2) In one mode of the method of manufacturing a sintered component as described above, the drill is configured so that a rake angle of the cutting edge may be more than 0° and 10° or less.

In view of suppression of occurrence of edge chipping, it is thought that a smaller cutting resistance (thrust load) is favorable. Since the rake angle of the cutting edge is more than 0° and 10° or less, a thrust load can be reduced and thus occurrence of edge chipping can be more effectively suppressed. Since the rake angle is more than 0°, the cutting edge becomes sharp and thus a thrush load is reduced. On the other hand, if the rake angle is increased, an edge strength is decreased as the cutting edge becomes sharp. However, since a work material to be machined is a powder-compact green body, chipping due to a decrease in edge strength hardly occurs. In view of ensuring an edge strength, the rake angle preferably is more than 0.01°, more preferably 0.1°.

If the rake angle is more than 10°, the thrust load is increased. Therefore, the rake angle preferably is 10° or less. In view if reducing the thrust load, the rake angle is more preferably, for example, 5° or more and 8° or less.

As used herein, the term "rake angle" refers to an angle γ defined between a plane parallel to the center axis of the drill and a rake face in a state where the cutting edge are arranged to be parallel to the parallel plane, as shown in a view on the right lower side of FIG. 3.

(3) In one mode of the method of manufacturing a sintered component as described above, the drill may be configured so that a circular arc defining the cutting edge has a central angle of 135° or more and 180° or less.

Since the circular arc defining the cutting edge has a central angle of 135° or more and 180° or less, occurrence of edge chipping can be sufficiently suppressed. If the central angle of the circular arc-shaped cutting edge is 135° or more, the shape of the cutting edge becomes close to a semi-circular shape, thereby causing a thrust load to be dispersed in a radial shape. Therefore, it is possible to enhance the effect of reducing a thrust load and also to cause a thrust load during drilling to be dispersed. Further, a shape of a bottom surface of the hole becomes close to a hemispheric shape, thereby enhancing a strength against a thrust load. In addition, a maximum thickness Ht of the bottom (see views on the left side of FIG. 1) is increased. Correspondingly, a strength of the bottom is enhanced and thus the bottom is hardly chipped. The central angle of the circular arc is more preferably, for example, 150° or more, particularly preferably 180° to obtain a semi-circular cutting edge.

On the other hand, a radius of the circular arc defining of the cutting edge preferably is generally equal to a radius of the circular arc defining of the cutting edge preferably is generally equal to a radius of a drill diameter, for example, preferably 0.4 times or more and 0.6 times or less of the drill diameter. In particular, the shape of the cutting edge preferably is a semi-circular shape, and preferably also, the central angle of the circular arc is 180° and the radius of the circular arc is 0.5 times of the drill diameter, i.e., equal to a radius of the drill diameter. As used herein, the "diameter of drill (or drill diameter)" refers to an outer diameter dimension of a portion on which the cutting edge is formed (so-called edge portion).

(4) A sintered component according to one aspect of the present invention is a sintered component having a hole formed therein. An inner circumferential surface of the hole has a satin finish shape.

When drilling using a drill is performed on a powder-compact green body before sintering as described above, bonding between metal powder particles is weak and thus a hole is formed as metal powder particles are cut while being scrapped by the drill. Accordingly, the inner circumferential surface of the hole formed in the powder-compact green body has a satin finish shape in which concave and convex portions due to particles are formed overall. Since such a surface aspect of the inner circumferential surface of the hole is substantially maintained even after sintering, an inner circumferential surface of the hole of the sintered component, which is obtained by sintering the powder-compact green body having the hole formed therein, has also a satin finish shape. In other words, the fact that the inner circumferential surface of the hole formed in the sintered component has the satin finish shape means that drilling using a drill is performed on the powder-compact green body before sintering. Such a sintered component, in which an inner circumferential surface of a hole thereof has a satin finish shape, has a good productivity, as compared with conventional sintered components, in which a hole is formed after sintering.

In contrast, when drilling using a drill is performed after sintering, bonding between metal powder particles is strong due to sintering and thus a hole is formed as a lump of metal a metal is cut by the drill. Accordingly, the inner circumferential surface of the hole formed by drilling the sintered component using a drill has an overall smooth surface having a few of concave and convex portions and thus becomes a shiny state.

(5) In one mode of the sintered component as described above, a ten point medial height Rz of the inner circumferential surface of the hole may be 20 μm or more.

When a hole is formed in a powder-compact green body a drill before sintering and then the powder-compact green body is sintered, a ten point median height Rz of an inner circumferential surface of a hole formed in the resulting sintered component may be for example 20 μm or more, although varying depending on shapes/sizes of metal powder particles. An upper limit of the ten point median height Rz of the inner circumferential surface of the hole may be, for example, 150 μm or less. In contrast, if a hole is formed by a drill after sintering, a ten point median height Rz of an inner circumferential surface of the hole formed in the sintered component is typically smaller than 20 μm, further 15 μm, or less.

(6) A drill according to one aspect of the present invention is a drill for drilling a work material. The work material is a powder-compact green body fabricated by press-molding a raw material powder containing a metal powder. The drill has a circular arc-shaped cutting edge on a point portion thereof.

According to the drill as described above, it is possible to suppress occurrence of edge chipping when a through-hole is formed in a powder-compact green body, since the circular arc-shaped cutting edge is provided on the point portion.

Details of Exemplary Embodiments of the Invention

Now, specific examples of a method for manufacturing a sintered component, a sintered component and a drill according to exemplary embodiments of the present invention will be described with reference to the accompanying drawings. Meanwhile, it should be noted that the present invention is intended not to be limited to such examples, but to be defined by the appended claims and also to encompass all of changes within the meaning and scope of equivalency of the claims.

<Method for Manufacturing a Sintered Component>

A method for manufacturing a sintered component according to an embodiment of the present invention includes a molding step of fabricating a powder-compact green body; a drilling step of forming a hole in the powder-compact green body using a drill; and a sintering step of sintering the powder-compact green body after drilling. One of features of the method for manufacturing a sintered component is that a drill having a circular arc-shaped cutting edge on a point portion thereof is used in the drilling step. Hereinafter, each step of the manufacturing method will be described in detail, principally referring to FIG. 2.

(Mold Step)

Figure 2:
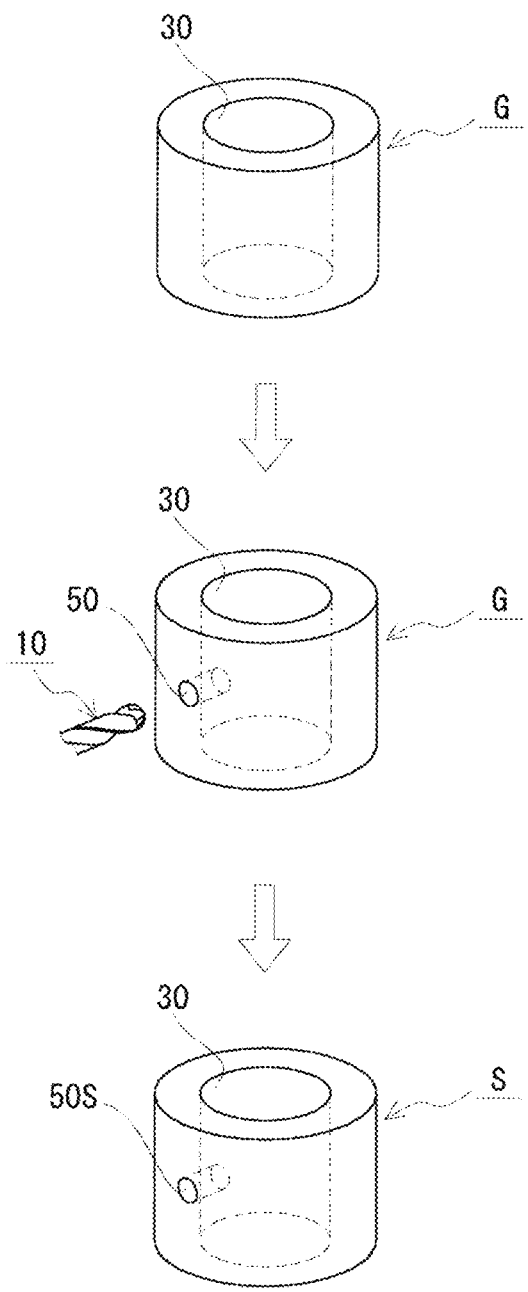
FIG. 2 is a process explanatory view explaining a method for manufacturing a sintered component according to an embodiment.

In the molding step, a raw material powder containing a metal powder is press-molded to fabricate a powder-compact green body G (see a view on the top of FIG. 2). The powder-compact green body G is a material for a sintered component and thus is formed to have a shape corresponding to a sintered component S (see a view on the bottom of FIG. 2) to be manufactured. Herein, as the powder-compact green body G (sintered component S), a cylindrical body in which an circular axial bore 30 is formed at the center thereof will be described by way of example.

<Raw Material Powder>

The raw material powder essentially contains a metal powder. A material for the metal powder can be properly selected depending on a material of a sintered component to be manufactured and may typically include iron-based materials. The "iron-based materials" mean iron or iron alloy, whose main constituent is iron. The iron alloy includes alloy containing one or more additive elements selected, for example, from Ni, Cu, Mo, Man, C, Si, Al, P, B, N and Co. Specifically, the iron alloy includes stainless steel, Fe—C alloy, Fe—Cu—Ni—Mo alloy, Fe—Ni—Mo—Mn alloy, Fe—P alloy, Fe—Cu alloy, Fe—Cu—C alloy, Fe—Cu—Mo alloy, Fe—Ni—Mo—Cu—C alloy, Fe—Ni—Cu alloy, Fe—Ni—Mo—C alloy, Fe—Ni—Cr alloy, Fe—Ni—Mo—Cr alloy, Fe—Cr alloy, Fe—Mo—Cr alloy, Fe—Cr—C alloy, Fe—Ni—C alloy, Fe—Mo—Mn—Cr—C alloy and the like. By essentially containing an iron-based material powder, an iron-based sintered component is obtained. If an iron-based material powder is essentially contained, a content thereof may be set to, for example, 90 mass % or more, further 95 mass % or more, assuming that the raw material powder is 100 mass %.

When an iron-based material powder, in particular an iron powder is essentially contained, metal powders, such as Cu, Ni and Mo, may be added as alloy constituents. Cu, Ni and Mo are elements intended to enhance hardenability, and an amount of addition thereof may be set to, for example, more than 0 mass % and 5 mass % or less, further 0.1 mass % or more and 2 mass % or less, assuming that the raw material powder is 100 mass %. Also, a nonmetallic inorganic material, such as carbon (graphite) powder may be added. C is an element intended to enhance strength of a sintered body or heat-treated body, and content thereof may be set to, for example, more than 0 mass % and 2 mass % or less, further 0.1 mass % or more and 1 mass % or less, assuming that the raw material powder is 100 mass %.

Preferably, the raw material powder contains a lubricant. By containing the lubricant in the raw material powder, when the raw material powder is press-molded to fabricated a powder-compact green body, lubricity upon molding can be increased and thus moldability can be enhanced. Therefore, even if a pressure for press-molding is lower, a densified powder-compact green body G can be easily obtained and thus a high-density sintered component S can also be easily obtained. Further, if the lubricant is mixed with the raw material powder, the lubricant is dispersed inside the powder-compact green body G and thus also serves as a lubricant for a drill when the powder-compact green body G is drilled using the drill 10 in the subsequent step (see a view on the middle of FIG. 2). Therefore, a cutting resistance (thrust load) can be reduced or a tool life can be improved. For example, the lubricant includes metal soaps, such as zinc stearate and lithium stearate; fatty acid amides such as stearic acid amide; higher fatty acid amides such as ethylene-bis-stearic acid amide and the like. The lubricant may take any form, such as solid form powder form or liquid form. A content of the lubricant may be set to, for example, 2 mass % or less, further 1 mass % or less, assuming that the raw material powder is 100 mass %. If a content of the lubricant is 2 mass % or less, it is possible to increase a proportion of metal powder to be contained in a powder-compact green body G. Accordingly, even if a pressure for press-molding is lower, a densified powder-compact green body G can be easily obtained. Further, it is possible to suppress a volumetric shrinkage due to dissipation of the lubricant when the powder-compact green body G is sintered in the subsequent step. As a result, a high-density sintered component S having an enhanced dimension precision can be easily obtained. From the point of view that the effect of enhancing lubricity is obtained, the content of the lubricant is preferably set to 0.1 mass % or more, further 0.5 mass % or more.

For this reason, the content of the lubricant may be preferably set to 0.1 mass % or more and 2 mass % or less, further 0.5 mass % or less and 1 mass % or less, assuming that the raw material powder is 100 mass %.

The raw material powder contains no organic binder. Since no organic binder is contained in the raw material powder, a proportion of metal powder to be contained in a powder-compact green body can be increased. Accordingly, even is a pressure for press-molding is lower, a densified powder-compact green body G can be easily obtained. In addition, there is no need to degrease the powder-compact green body G in the subsequent step.

The raw material powder essentially consists of the metal powder as described above and is also permitted to contain inevitable impurities.

As the metal powder described above, water atomized powder, reduction powder, gas atomized powder and the like may be employed, and among others, water atomized powder or reduction powder are preferable. The water atomized powder or reduction powder has a lot of concave and convex portions formed on a surface of particles. Accordingly, concave and convex portions of particles are engaged with each other during molding, thereby enhancing a shape retaining ability of the powder-contact green body G. In general, from the gas atomized powder, particles having a few of concave and convex portions on a surface thereof are apt to be obtained, whereas from the water atomized powder or reduction powder, particles having lot of concave and convex portions on a surface thereof are apt to be obtained. Also, an average particle diameter of the metal powder may be, for example, 20 μm or more, 50 μm or more and 150 μm or less. The "average particle diameter of the metal powder" is a particle diameter (D50), at which a cumulative volume in a volumetric particle size distribution as measured by a laser diffraction particle size measuring device becomes 50%. So long as the average particle diameter of the metal powder is within the above range, treating thereof is easy and thus press-molding is facilitated.

<Press-Molding>

For press-molding, a molding apparatus (mold), by which a shape corresponding to a shape of a sintered component as a final product can be molded, is employed. In the cylindrical powder-compact green body G as illustrated in FIG. 2, an axial bore 30 is integrally formed during molding. The powder-compact green body G may be formed, for example, using upper and lower punches having a circular ring-shaped pressing surface for forming both end surface of the powder-compact green body G, a circular columnar-shaped inner die configured to be inserted into the insides of the upper and lower punches for forming an inner circumferential surface of the powder-compact green body G, and an outer die configured to surround outer circumference surfaces of the upper and lower punches and having an circular insertion hole formed therein for forming an outer circumferential surface of the powder-compact green body G. Both axial end surfaces of the powder-compact green body G are surfaces, which are pressed by the upper and lower punches, the inner and outer circumferential surfaces thereof are surfaces in sliding contact with the inner and outer dies, and the axial bore 30 is integrally formed during molding. A pressure for press-molding may be 250 MPa or more and 800 MPa or less.

[Drilling Step]

In the drilling step, a hole 50 is formed in the powder-compact green body G using a drill 10 (see a view on the middle of FIG. 2). The hole 50 may be a through-hole or blind hole. Herein, a through-hole, which extends from the outer circumferential surface to the inner circumferential surface of the powder-compact green body G, is formed using the drill 10. Namely, the axial bore (molded hole) 30, which is molded in the powder-compact green body G, and the through-hole (drilled hole) 50, which is formed using the drill 10, are connected with each other, and thus an opening on an exit side of the through-hole 50 is provided on the inner circumferential surface (inner circumferential surface of the axial bore 30) of the powder-compact green body G. In this example, the through-hole 50 is formed at a location where a distance (thickness) between an inner circumferential surface of the through-hole 50 and an outer surface (end surface) of the powder-compact green body G is equal to or more than a diameter of the through-hole 50. The drill 10 used for drilling of the powder-compact green body G will be described with reference to FIG. 3.

<Drill>

A view on the left upper side of FIG. 3 is a schematic plan view of the drill, a view on the left lower side of FIG. 3 is a schematic front view of the drill as viewed from a point side thereof, and a view on the right lower side of FIG. 3 is a schematic side view partially showing a point portion of the drill. The drill 10 is intended to drill into a work material. The work material is the powder-compact green body G (see the view on the middle of FIG. 2) obtained by press-molding a raw material powder containing a metal powder. The drill 10 is configured according to an embodiment of the present invention.

The drill 120 as illustrated in FIG. 3 is a so-called R drill, which has a circular arc-shaped cutting edge 110 on a point portion 100 thereof. The point portion 100 is a portion ranging from a point (apex) of the cutting edge 110 to outer corners 120.

<Shape of Cutting Edge>

As shown in the view on the left upper side of FIG. 3, the drill 10 is configured so that that cutting edge 110 has a circular arc-shaped projection shape, as viewed in a plan view from a direction perpendicular to a plane parallel to a center axis of the drill 10 in a state where the cutting edge 110 are in turn arranged to be parallel to the parallel plane.

A central angle $\alpha$ of a circular arc defining the cutting edge 110 is, for example, 130° or more, preferably, 135° or more and 180° or less, more preferably 150° or more. In this example, the central angle $\alpha$ of the circular arc is 180°.

A radius R of the circular arc defining the cutting edge is, for example, 0.4 times or more and 0.6 times or less of a drill diameter d and preferably equal to 0.5 times of a diameter d of the drill, i.e., a radius (d/2) of the drill diameter d. In this example, a shape of the cutting edge is a circular arc shape, a central angle of the circular arc is 180°, and a radius R of the circular arc is equal to the radius of the drill diameter d. For example, the diameter d of the drill 10 is, but not particularly limited to, 1.1 mm or more and 20.0 mm or less.

<Rake Angle of Cutting Edge>

A rake angle of the cutting edge 110 is, for example, 0° or more, preferably more than 0° and 10° or less, more preferably 5° or more and 8° or less. As shown in the view on the right lower side of FIG. 3, the rake angle of the cutting edge 110 is an angle $\gamma$ defined between a plane P parallel to the center axis of the drill 10 and a rake face 111 defining the cutting edge 110, as viewed as viewed in a side view from a direction perpendicular to the center axis of the drill 10 and also parallel to a horizontal plane in a state where the cutting edge 110 are in turn arranged to be parallel to the plane parallel to the axis. In this example, the rake angle of the cutting edge 110 is 7°.

<Cutting Condition>

Cutting conditions, such as the number of revolutions or a feed rate (or feed amount) of the drill 10, may be properly set depending on a material of the powder-compact green body G (metal powder), a depth of the through-hole 50 to be formed, or a diameter of the drill 10 (see FIG. 2). For example, the number of revolution may be set to 1000 rpm or more, further 2000 rpm or more, the feed rate may be set to 100 mm/min or more, further 200 mm/min or more, and the feed amount may be set to 0.01 mm/rev. or more, further 0.1 mm/rev, or more. It is proved through experiments that is a powder-compact green body is machined, machining can be performed at a higher speed, as compared with the case where a sintered body is machined.

The inner circumferential surface of the hole (through-hole) 50 formed in the powder-compact green body G using the drill 10 has a satin finis shape. Bonding between metal powder particles in the powder-compact green body G is weak. Therefore, when drilling is performed using the dill, the through-hole 50 is formed as metal powder particles are cut while being scrapped by the drill. Accordingly, the inner circumferential surface of the through-hole 50 formed in the powder-compact green body G has such a satin finish shape in which concave and convex portions due to particles are formed overall.

(Sintering Step)

In the sintering step, the powder-compact green body G after drilling is sintered. For sintering, a sintering furnace (not shown) capable of controlling a temperature atmosphere is used. Sintered conditions may be properly selected from any conditions required for sintering depending on a material of the powder-compact green body G (metal powder) and the like. A sintering temperature may be set to, for example, 1000° C. or more, further 1100° C. or more, 1200° C. or more, and also set to a temperature (e.g., 1400° C. or less) equal to or lower than a melting point of a main metal powder. A sintering time may be set to, for example 15 minutes or more and 15 minutes or less, further 20 minutes or more and 60 minutes or less. By sintering, a sintered component S having a hole (through-hole) 50S is obtained (see a view on the bottom of FIG. 2). The sintered component S is configured according to an embodiment of the present invention.

<Sintered Component>

In the sintered component S, the hole (through-hole) 50S is formed. The through-hole 50S is the through-hole 50 formed in the powder-compact green body G by drilling using the drill 10 before sintering (see a view on the middle of FIG. 2). As described above, the inner circumferential surface of the through-hole 50 formed in the powder-compact green body G using the drill 10 has the satin finish shape. Since such a surface aspect of the inner circumferential surface of the through-hole 50 is substantially maintained even after sintering, an inner circumferential surface of the through-hole 50S of the sintered component S, which is obtained by sintering the powder-compact green body G, has also a satin finish shape. In other words, the fact that the inner circumferential surface of the through-hole 50S formed in the sintered component S has the satin finish shape means that drilling using the drill 10 is performed on the powder-compact green body G before sintering. In the sintered component S, a ten point medial height Rz of the inner circumferential surface of the through-hole 50 may be, for example, 20 µm or more or 150 µm or less.

In this example, the through-hole 50S is formed at a location where a distance (thickness) between the inner circumferential surface of the through-hole 50S and an outer surface (end surface) of the sintered component S is equal to or more than a diameter of the through-hole 50S.

[Action and Effects]

In the method for manufacturing a sintered component according to the forgoing embodiments, drilling using a drill is performed on a powder-compact green body before sintering. Accordingly, cutting can be easily performed and also a cutting resistance (thrust load) can be significantly reduced. Therefore, as compared with a conventional manufacturing method in which drilling using a drill is performed after sintering, a machining time ca be reduced, a precision of a machined hole can be enhanced and also a tool life can be significantly improved. Further, in the method for manufacturing a sintered component according to the above embodiments, drilling is performed using a drill, which has a circular arc-shaped cutting edge on a point portion thereof. Accordingly, when a through-hole is formed in the powder-compact green body, occurrence of edge chipping can be suppressed. As a result, the method for manufacturing a sintered component as described above can suppress occurrence of edge chipping and also has a good productivity.

In the sintered component according to the foregoing embodiments, the hole (through-hole) is formed therein and the inner circumferential surface of the hole has the satin finish shape. Accordingly, since this means that drilling using a drill is performed on a powder-compact green body before sintering, the sintered component has a good productivity.

In the drill according to the foregoing embodiments, the circular arc-shaped cutting edge is provided on the point portion thereof. Accordingly, it is possible to suppress occurrence of edge chipping when a through-hole is formed in a powder-compact green body.

Although in the foregoing embodiments, the case where the through-hole is formed in the powder-compact green body using the drill has been described by way of example, a hole to be formed by be a blind hole. In the case of the blind hole, it is possible to make a thickness of a bottom of the hole thinner. For example, the drill is suitable for a case where a blind hole is formed such that a thickness of a bottom thereof is 2 times or less of a drill diameter (hole diameter). A lower limit of the thickness of the bottom may be set to about ¼ or more of the drill diameter (hole diameter), or about ½ or more.

Test Example 1

Powder-compact green bodies were fabricated by press-molding a raw material powder containing a metal powder and then a drilling test was performed on the powder-compact green bodies using drills having different cutting edge shapes.

(Powder-Compact Green Body)

A water atomized iron powder (average particle diameter (D50): 100 µm), a water atomized copper powder (average particle diameter (D50): 30 µm), a carbon (graphite) powder (average particle diameter (D50): 20 µm) and ethylene-bis-stearic acid amide as a lubricant were prepared, and then by mixing them, a raw material powder was prepared.

The prepared raw material powder was filled in predetermined mold and then press-molded at a pressing pressure of 600 MPa. In this way, plate-shaped powder-compact green bodies having size of length 50 mm×width 20 mm×thickness 10 mm were fabricated. A density of powder-compact green bodies was 6.9 g/cm³. This density is an apparent density as calculated from size and mass of the powder-compact green bodies.

Subsequently, drilling was performed on the fabricated powder-compact green bodies using the drills, thereby forming a through-hole in a thickness direction of the powder-compact green bodies. Then, an opening on an exit of the through-hole was observed and an occurrence situation of edge shipping was checked.

As one of drills, an R drill, in which a shape of a cutting edge thereof is semi-circular as shown in FIG. 3, was prepared. In the prepared R drill, a drill diameter d was 8.0 mm, a central angle α of a circular arc defining the cutting edge was 180°, and radius R of the circular arc was 4.0 mm (0.5 times of the drill diameter d). Also, a rake angle of the cutting edge was 0°. The R drill was fabricated by grinding a cutting edge on a point portion of a drill (Model No. MDW0800GS4, a material; sintered carbide) produced by Sumitomo Electric Hardmetal Co.

Also, a V drill, in which a shape of a cutting edge thereof is a V-shape, was prepared. The prepared V drill was a drill (Model No. 05WHNSB0400-TH, material: sintered carbide) produced by Hitachi Tool Engineering, Ltd. In the V drill, a drill diameter d was 4.0 mm and a point angle of the cutting edge was 140°.

Drilling was performed on the powder-compact green bodies using the R drill and the V drill, thereby forming a through-hole. In the case of using the R drill, cutting conditions were the number of revolutions of 4000 rpm and a feed rate of 1600 mm/min. In the case of using the V drill, cutting conditions were the number of revolutions of 4000 rpm, a feed rate of 800 mm/min from an entrance of the hole up to a hole depth of 5 mm, and then a feed rate of 1600 mm/min from the hole depth of 5 mm up to penetration.

Figure 4:
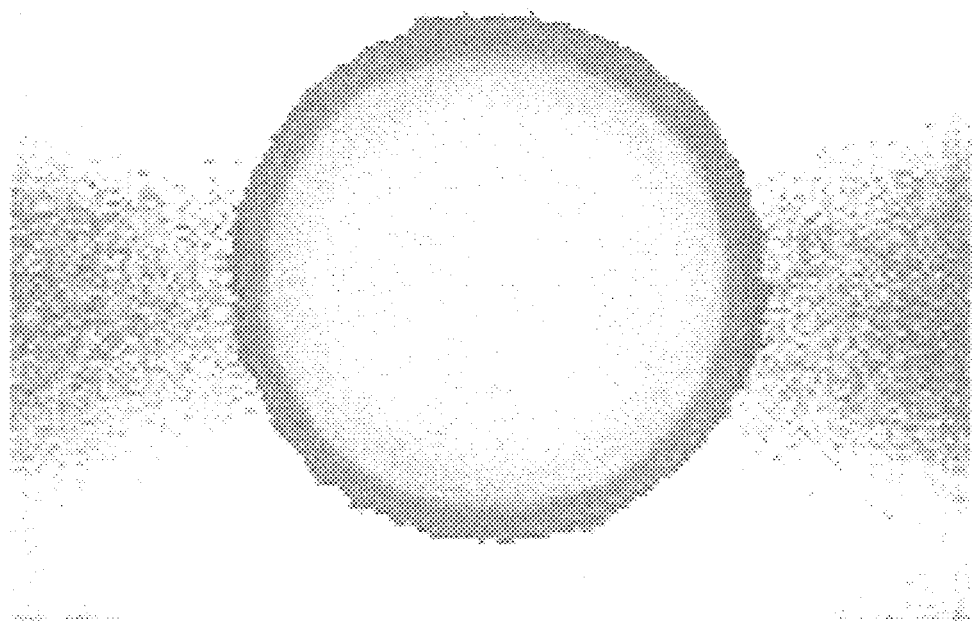
FIG. 4 is a microscopic image showing an exit of a through-hole in the case where the through-hole is formed using an R drill in Test Example 1.
Figure 5:
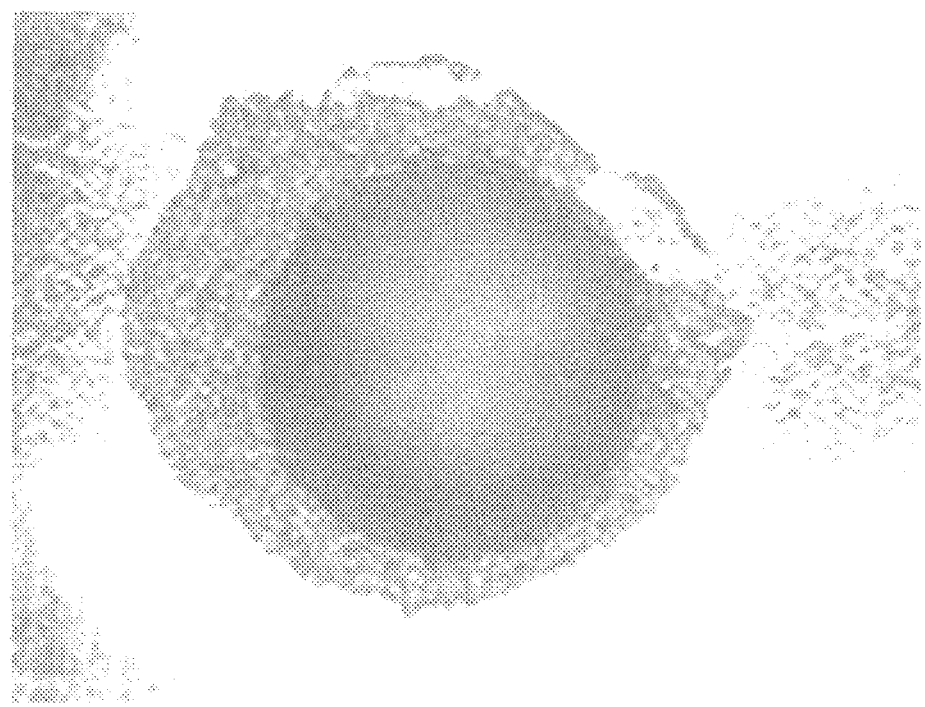
FIG. 5 is a microscopic image showing an exit of a through-hole in the case where the through-hole is formed using a V drill in Test Example 1.

After drilling, with respect to the powder-compact green bodies in which through-hole was formed using each of the drills, an opening on an entrance side of the through-hole was observed using an optical microscope. The results are shown in FIGS. 4 and 5. FIG. 4 is the case of using the R drill and FIG. 5 is the case of using the V drill.

In FIG. 4, a black annular portion, which has a constant width and borders a periphery of the central circular portion (through-hole), is an inner circumferential surface of the through-hole. As shown in FIG. 4, it can be seen that if a through-hole is formed using the R dill, a very few of edge chipping occur on an opening on an entrance side of the through-hole, and in this example, no edge chipping can be founded.

In FIG. 5, a grey portion, which is spread around the through-hole, is an edge chipping. As shown in FIG. 5, it can be seen that if a through-hole is formed using the V drill, a large edge chipping occurs on an opening on an entrance side of the through-hole. Also, an amount of edge chipping in the case where the through-hole was formed by the V drill was measured as 1.55 mm. The amount of edge chipping was obtained by measuring a distance from the center of the through-hole to the remotest point among points, which are located on a contour of an edge chipped portion, from the microscope image of FIG. 5, and then calculating a difference between the distance and the diameter of the through-hole.

From this result, it can be seen that occurrence of edge chipping can be suppressed by using an R drill having a circular-arc shaped cutting edge.

Test Example 2

Drilling was performed on powder-compact green bodies using R drills having different rake angles and then thrust loads when forming a through-hole were compared with each other.

As powder-compact green bodies to be machined, the same as those in Test Example were employed.

Like Test Example 1, the R drills used had a cutting edge of a semi-circular shape and were fabricated by grinding a cutting edge on a point portion of a drill (Model No. MDW0800GS4, material; sintered carbide) produced by Sumitomo Electric Hardmetal Co. In these R drills, a drill diameter d was 8.0 mm, a central angle α of a circular arc defining the cutting edge was 180°, and a radios R of the circular arc was 4.0 mm (0.5 times of the drill diameter d). In addition, three types of R drills having rake angles of 0°, 7° and 10°, respectively, were fabricated. An R drill having a rake angle of 0° was referred to as R0, an R drill having a rake angle of 7° was referred to as R7, and an R drill having a rake angle of 10° was referred to as R10.

Drilling was performed three times on the powder-compact green bodies using each of the three types of drill (R0, R7, R10), thereby forming three through-holes in a thickness direction of the powder-compact green bodies. Cutting conditions were the number of revolutions of 2000 rpm and a feed rate of 200 mm/min (feed amount of 0.1 mm/rev). Also, for each of the first to third drilling, thrust loads and torques when forming a through-hole were measured. Thrust loads and torques were measured from beginning of drilling until a through-hole is formed, using a cutting dynamometer (Model No. 9272 produced by Kistler Japan Co., Ltd.), and maximum values thereof were obtained. Also, average values were calculated from each thrust load and torque in each drilling process.

Thrust loads and torques when drilling was performed using the drills R0, R7 and R10 are shown in Tables 1 to 3, respectively. For example, the reference character "R0-1" in Table 1 means the first drilling using the drill R0, the thus the symbol on the front half thereof indicates the drill used and the number on the rear half indicates the number of times of machining (the same is also applied to Tables 2 and 3).

Figure 6:
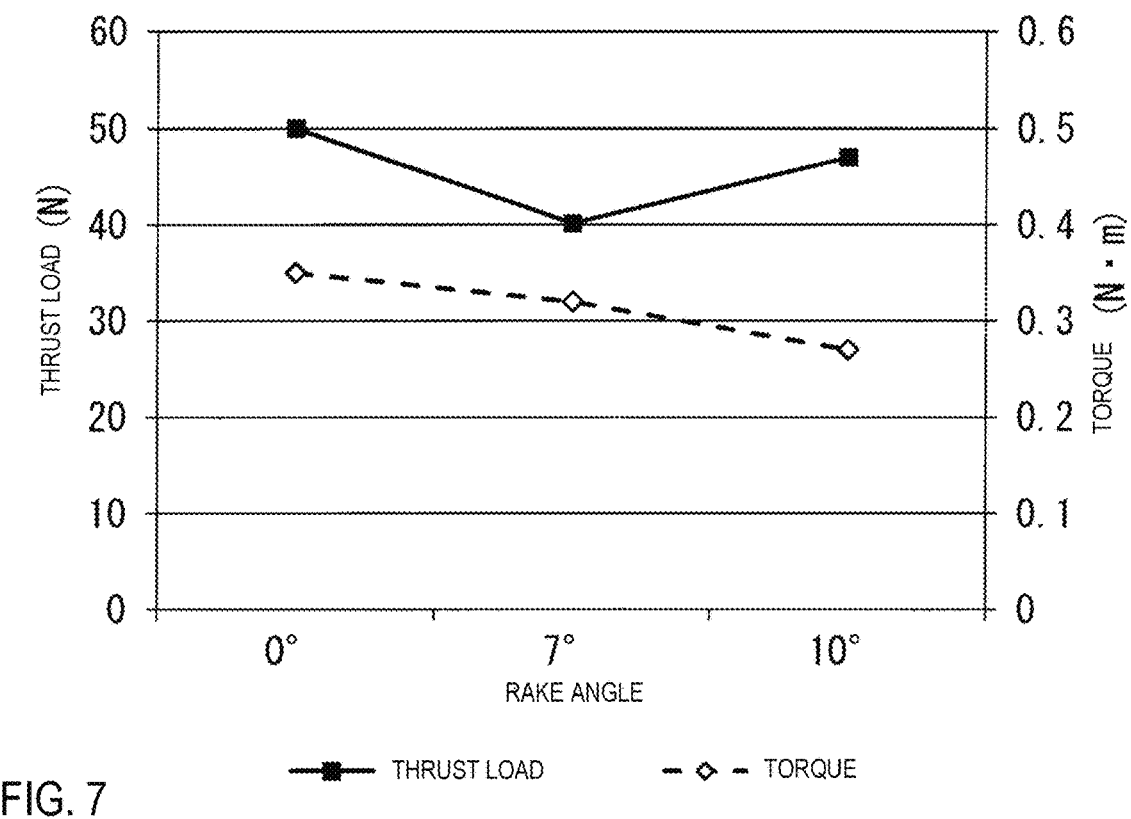
FIG. 6 is a graph showing a relationship of a rake angle, a thrust load and a torque in the case where a through-hole is formed using an R drill in Test Example 2.

Further, in FIG. 6, a relationship of a rake angle to a thrust load and a torque is shown based on the average values of thrust loads and torques in each drill. In the graph of FIG. 6, a horizontal axis represents a rake angle (degree, °), a vertical axis on the left side represents a thrust load (N), a vertical axis on the right represents a torque (N·m), the symbol ■ is a thrust load and the symbol ◇ is a torque.

TABLE 1

|  | Thrust Load (N) | Torque (N · m) |
| --- | --- | --- |
| R0-1 | 49.15 | 0.33 |
| R0-2 | 50.46 | 0.39 |
| R0-3 | 50.54 | 0.32 |
| Ave. | 50.05 | 0.35 |

TABLE 2

|  | Thrust Load (N) | Torque (N · m) |
| --- | --- | --- |
| R7-1 | 38.70 | 0.31 |
| R7-2 | 40.20 | 0.34 |
| R7-3 | 41.59 | 0.30 |
| Ave. | 40.16 | 0.32 |

TABLE 3

|  | Thrust Load (N) | Torque (N · m) |
| --- | --- | --- |
| R10-1 | 47.89 | 0.27 |
| R10-2 | 46.68 | 0.26 |
| R10-3 | 46.51 | 0.29 |
| Ave. | 47.03 | 0.27 |

From the results of Tables 1 to 1 and FIG. 6, it can be seen that a thrust load on an R drill having a rake angle 7° is smaller than those on R drills having rake angles of 0° and 10°, respectively. It is thought if a rake angle is within a range of more than 0° and 10° or less, a thrust load can be reduced as compare with the case where a rake angle is 0°. Therefore, it is though that occurrence of edge chipping can be more effectively suppressed by using an R drill having a rake angle of more than 0° and 10° or less. On the other hand, it can be seen that a torque tends to be decreased as a rake angle is increased.

Test Example 3

After drilling is performed on a powder-compact green body using an R drill, the powder-compact green body in which a through-hole is formed by the R drill was sintered, thereby fabricating a sintered component.

As the powder-compact green body to be machined, the same as those in Test Example was employed.

Herein, an R drill in which a shape of a cutting edge thereof is semi-circular and a drill diameter d is 3.5 mm was employed. The R drill was fabricated by grinding a cutting edge on a point portion of a drill (Model No. MDW0350GS4, material: sintered carbide) produced by Sumitomo Electric Hardmetal Co. In the R drill, a central angle α of a circular arc defining the cutting edge was 180°, a radios R of the circular arc was 1.75 mm (0.5 times of the drill diameter d), and a rake angle was 0°.

Drilling was performed on the powder-compact green body using the R drill, thereby forming a through-hole in a thickness of the powder-compact green body. Cutting conditions were the number of revolutions of 2000 rpm and a feed rate of 200 mm/min (feed amount of 0.1 mm/rev). After drilling, the powder-compact green body, in which the through-hole was formed, was sintered at a temperature of 1130° C. during 20 minutes, thereby fabricating a sintered component.

Figure 7:
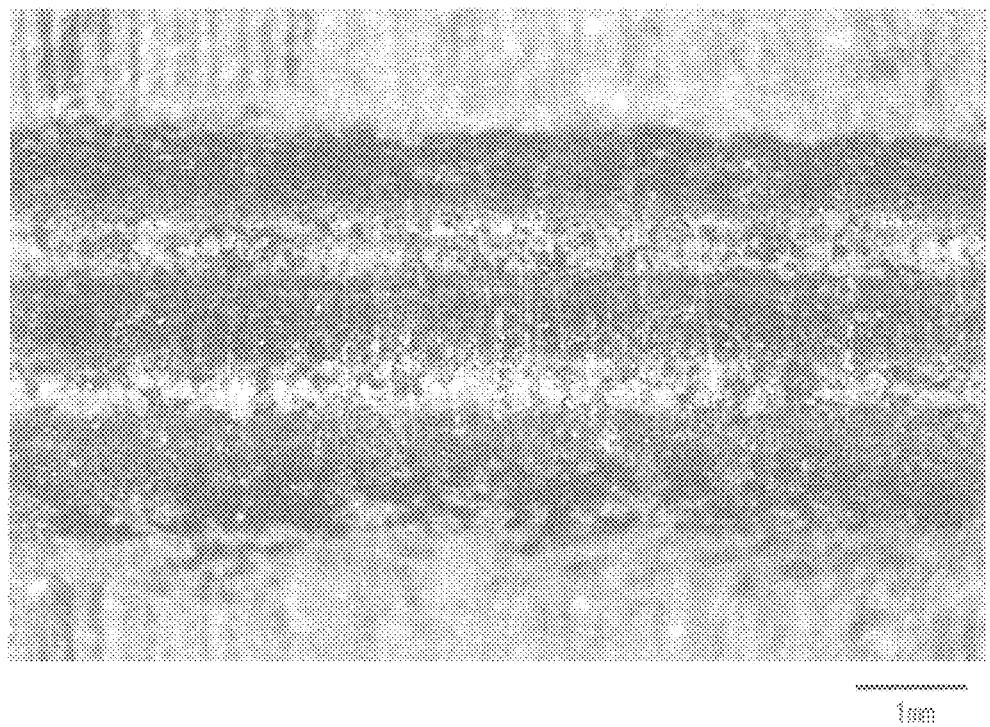
FIG. 7 is a microscopic image showing an inner circumferential surface of through-hole of a powder-compact green body fabricated in Test Example 3.

A powder-compact green body in which a through-hole was formed in the same manner, was cut along a thickness direction thereof through a center axis of the through-hole, and an inner circumferential surface of the through-hole was observed by an optical microscope. A photograph of the cross section is shown in FIG. 7. A band-shaped portion laterally extending in FIG. 7 is the inner circumferential surface of the through-hole. As shown in FIG. 7, a shape of the inner circumferential surface of the through-hole is a satin finish shape. Further, a ten point median height Rz of the inner circumferential surface was measured as 40 μm. Also, the sintered component fabricated as described above was cut along a thickness direction thereof through a center axis of the through-hole, and an inner circumferential surface of the through-hole was observed by the optical microscope. The inner circumferential surface had the same surface aspect that of the inner circumferential surface of the through-hole of the powder-compact green body as described above, and also a ten point median height Rz thereof was the same. The ten point median heights Rz were values as measured in accordance with the standard "Geometrical Product Specifications (GPS)—Surface texture: Profile method—Terms, definitions and surface texture parameters JIS B 0601:2013".

A through-hole was formed in a sintered component after sintering, using a drilling and then in the same manner, an inner circumferential surface of the through-hole was observed. As a result, although not shown, the inner circumferential surface of the through-hole was a smooth surface having a few of concave and convex portions and thus was a shiny state. Also, a ten point medial height Rz of the inner circumferential surface of the through-hole was measured of 11 μm. The drill used for drilling of the sintered component was MDW0350GS4 produced by Sumitomo Electric Hardmetal Co., in which a shape of a cutting edge thereof was a V shape, a drill diameter d was 3.5 mm and a point angle of the cutting edge was 135°.

This application is based on Japanese Patent Application No. 2014-252531 filed on Dec. 12, 2014, the entire contents of which are incorporated herein by reference.

INDUSTRIAL APPLICABILITY

The method for manufacturing a sintered component according to one aspect of the present invention can be used for manufacturing various sintered components, such as automobile parts and machine parts (sprockets, rotors, gears, rings, flanges, pulleys, vanes, bearings and like). The sintered component according to one aspect of the present invention can be used for various sintered components, such as automobile parts and machine parts. The drill according to one aspect of the present invention can be used for drilling of a powder-compact green body.

REFERENCE NUMERALS LIST

10 Drill (R drill)
11 Drill (V drill)
100 Point portion
110 Cutting edge
111 Rake face
120 Outer corner
30 axial bore
50 Hole (through-hole)
50S Hole (through-hole)
G Powder-compact green body (work material)
S Sintered component

The invention claimed is:

1. A method for manufacturing a sintered component, comprising:
    a molding step of press-molding a raw material powder containing a metal powder and a powder lubricant and thus fabricating a powder-compact green body in which the lubricant is dispersed;
    a drilling step of forming a hole in the powder-compact green body using a drill, the hole having an inner circumferential surface whose shape is a satin finish shape; and
    a sintering step of sintering the powder-compact green body after drilling,
    wherein the powder-compact green body is formed before a heat treatment,
    wherein the raw material powder contains no organic binder,
    wherein the drill used for drilling has a circular-arc shaped cutting edge on a point portion thereof,
    wherein the drill is configured so that a rake angle of the cutting edge is more than 0° and 10° or less,
    wherein the rake angle of the cutting edge is an angle between a center axis of the drill and the cutting edge, and
    wherein the cutting edge cuts the powder compact green body to form the hole.

2. The method according to claim 1, wherein the drill is configured so that a circular arc defining the cutting edge has a central angle of 135° or more and 180° or less.

3. The method according to claim 1, wherein the drilling step has a feed rate of 200 mm/min or more.

4. The method according to claim 1, wherein the lubricant is set to 0.1 mass % or more and 2 mass % or less, assuming that the raw material powder is 100 mass %.

* * * * *